(12) United States Patent
Mercat et al.

(10) Patent No.: US 7,481,497 B2
(45) Date of Patent: Jan. 27, 2009

(54) HUB OF A TENSION SPOKE CYCLE WHEEL, AND SPOKE CYCLE WHEEL EQUIPPED WITH SUCH A HUB

(75) Inventors: Jean-Pierre Mercat, Chavanod (FR); Pascal Baron, Seynod (FR)

(73) Assignee: Salomon S.A., Metz-Tessy (FR)

( * ) Notice: Subject to any disclaimer, the term of this patent is extended or adjusted under 35 U.S.C. 154(b) by 29 days.

(21) Appl. No.: 11/366,422

(22) Filed: Mar. 3, 2006

(65) Prior Publication Data

US 2006/0197370 A1   Sep. 7, 2006

(30) Foreign Application Priority Data

Mar. 4, 2005   (FR) .................................. 05 02212

(51) Int. Cl.
*B60B 1/02*   (2006.01)
*B60B 27/00*   (2006.01)

(52) U.S. Cl. ...................................... 301/59; 301/110.5

(58) Field of Classification Search ................... 301/55, 301/56, 57, 59, 61, 104, 110.5
See application file for complete search history.

(56) References Cited

U.S. PATENT DOCUMENTS

| 478,394 | A | 7/1892 | Bretz |
| 607,175 | A | 7/1898 | Keating |
| 5,626,401 | A | 5/1997 | Terry, Sr. et al. |
| 5,882,088 | A | 3/1999 | Yahata |
| 6,010,197 | A | 1/2000 | Crosnier et al. |
| 6,126,243 | A | 10/2000 | Okajima et al. |
| 6,189,978 | B1 | 2/2001 | Lacombe et al. |
| 6,375,273 | B2 | 4/2002 | Pont |
| 6,409,278 | B1 * | 6/2002 | Nakajima ..................... 301/59 |
| 6,899,401 | B2 * | 5/2005 | Schlanger ..................... 301/59 |
| 2001/0054840 | A1 * | 12/2001 | Schlanger ..................... 301/59 |
| 2003/0098608 | A1 | 5/2003 | Okajima |

FOREIGN PATENT DOCUMENTS

| EP | 0 786 360 | A2 | 7/1997 |
| EP | 0 896 886 | A1 | 2/1999 |
| EP | 1 016 553 | A2 | 7/2000 |
| EP | 1 316 442 | A2 | 6/2003 |
| FR | 2 324 471 | A1 | 4/1977 |
| FR | 2324471 | A * | 5/1977 |
| FR | 2 794 063 | A1 | 12/2000 |
| FR | 2 802 853 | A1 | 6/2001 |

* cited by examiner

*Primary Examiner*—Jason R Bellinger
*Assistant Examiner*—Kip T Kotter
(74) *Attorney, Agent, or Firm*—Greenblum & Bernstein, P.L.C.

(57) ABSTRACT

A hub for cycle wheel including a shaft, a hub body rotatably mounted around the shaft. The hub body has, at least at one of its ends, merlons that are provided for fastening the spokes. Each of the merlons has a radial housing that opens out at its top, as well as two slots, each of the slots extending through the wall thickness between the radial housing and a distinct frontal surface of the merlon. The invention also relates to a cycle wheel having such a hub.

32 Claims, 4 Drawing Sheets

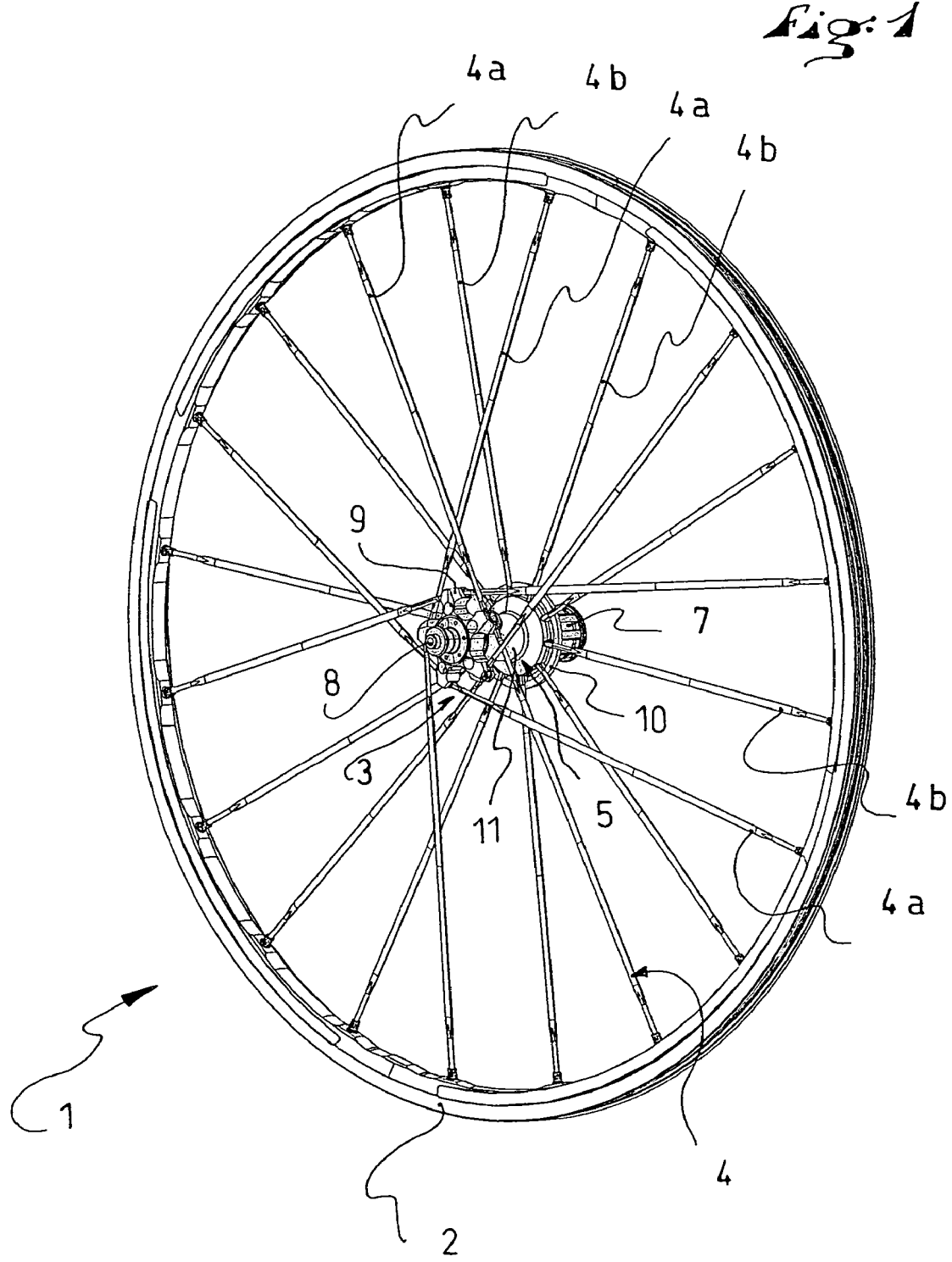

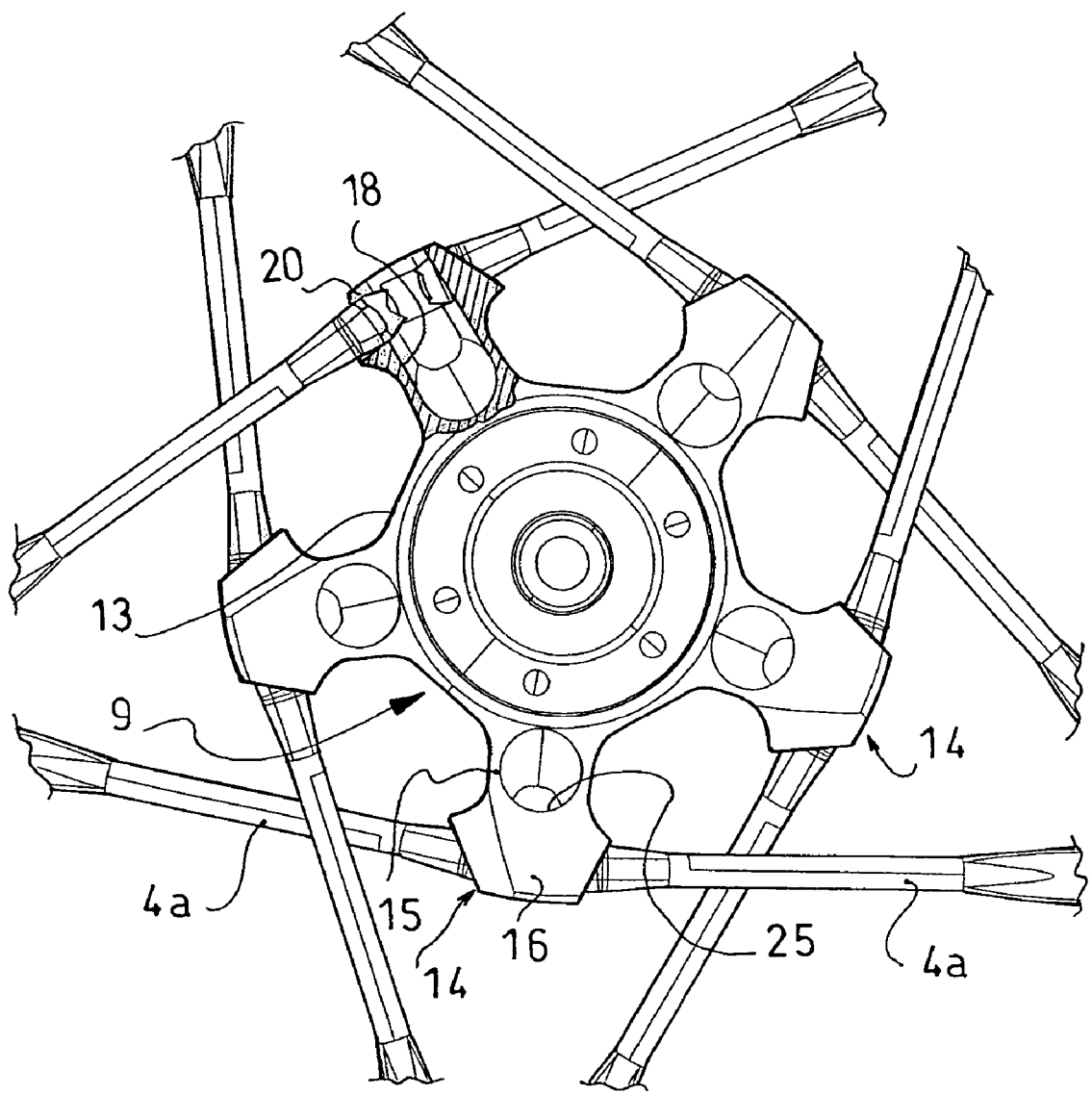

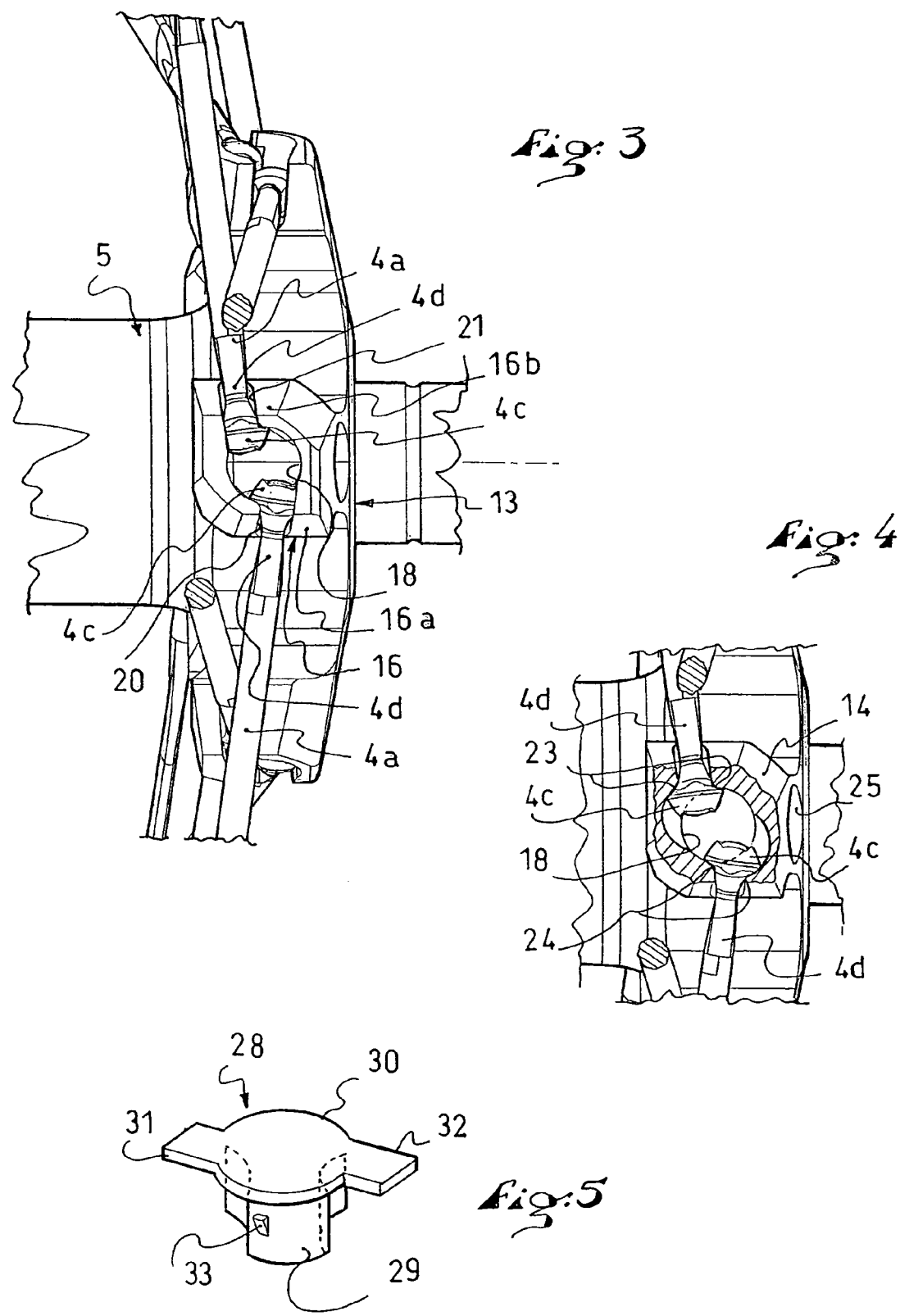

HUB OF A TENSION SPOKE CYCLE WHEEL, AND SPOKE CYCLE WHEEL EQUIPPED WITH SUCH A HUB

CROSS-REFERENCE TO RELATED APPLICATION

This application claims priority under 35 U.S.C. §119 of French Patent Application No. 05.02212, filed on Mar. 4, 2005, the disclosure of which is hereby incorporated by reference thereto in its entirety.

BACKGROUND OF THE INVENTION

1. Field of the Invention

The invention relates to the hub of a cycle wheel having tension spokes. The invention also relates to a spoked cycle wheel equipped with such a hub.

2. Description of Background and Relevant Information

As is known, a cycle wheel includes an annular rim with a channel for receiving a tire, such as a tubular tire or a more traditional beaded tire, as well as a central hub and spokes for connecting the rim and the hub.

The spokes are tensioned between the hub and the rim, the spoke tension being adjustable, such wheel therefore referred to as a tension spoke wheel.

There are two large families of spokes among the existing types of spokes, viz., straight spokes and bent spokes. The invention relates more particularly to the straight spoke family.

Among the hubs adapted to receive straight spokes are the so-called crenelled hubs. This designation is improper because, rather than crenels, the spokes are retained by radial elements which project with respect to the remainder of the hub body, which form merlons, i.e., a projecting portion between two crenels. The patent documents U.S. Pat. No. 478,394, FR 2 324 471, and FR 2 794 063 disclose such hubs. The merlons make it possible to use straight spokes which, in principle, withstand high tension forces better than bent spokes. They make it possible to orient the spokes tangentially in relation to the hub or along a direction close to tangent. Moreover, the merlon allows off-centering the spoke head with respect to the hub axis, therefore obtaining wider crossing angles and reducing the loading cycles of the spokes during transmission of torque. For the hubs described in the aforementioned documents, two openings extend through the merlons, and the spokes are inserted in a head-to-foot arrangement in each of the openings.

For other hubs with merlons, the merlons are machined with two oriented slots, and the spokes are engaged in the slots so that the heads bear on the ascending front of a merlon. Such a hub is disclosed, for example, in the patent document EP 0 896 886 and family member U.S. Pat. No. 6,189,978.

A hub with slotted merlons of this type enables an easy mounting of the spokes, and therefore facilitates the mounting of the wheel. Indeed, the spokes are not inserted; they are merely engaged.

However, during a ride, one or several spokes sometime lose tension momentarily. This may happen in particular during a frontal, lateral, or a combined impact.

Therefore, it is necessary to provide arrangements that prevent spokes from becoming detached under such a circumstance.

A first arrangement involves providing a small projecting tooth at the top of each of the merlons, which form, with the remainder of each of such merlons, a connection for retaining a spoke head. This mode of construction yields good results but is relatively complex and costly to implement.

Another drawback of the slotted merlon hubs lies in that the head-to-foot arrangement of the spokes causes the spokes to cross one another at a relatively great distance, because the spokes cross one another in the area of the merlons. Therefore, there is a significant unbalance in the tension of the spokes that are connected to the merlons inward of the hub body and those that are connected outward.

SUMMARY OF THE INVENTION

Therefore, an object of the invention is to propose a merlon hub that is simpler to make than the existing hubs.

Another object of the invention is to propose a hub construction improved in that it makes it possible to better balance the spoke tension.

Other objects and advantages will become apparent from the description that follows.

The hub according to the invention includes a shaft, a hub body rotatably mounted around the shaft, the hub body having two ends and being provided with mechanisms for fastening the spokes to each of the ends, such mechanisms including, for at least one of the ends, merlons that are radially oriented, each merlon having two frontal surfaces substantially parallel to the axis of rotation of the hub body. The merlons have a radial housing that opens out at their top and two slots, each of the slots extending through the wall thickness between the radial housing and a distinct frontal surface of the merlon.

BRIEF DESCRIPTION OF THE DRAWINGS

The invention will be better understood from the following description, with reference to the attached drawings, and in which:

FIG. 1 shows a cycle wheel consistent with the invention;
FIG. 2 is a side view of the wheel hub of FIG. 1;
FIG. 3 is a top and partial cut-away view of the hub of FIGS. 1 and 2, in the area of a merlon;
FIG. 4 is a view similar to that of FIG. 3, showing the merlon in cross section;
FIG. 5 shows a plug for blocking a merlon housing.

DETAILED DESCRIPTION OF THE INVENTION

Figure 6:
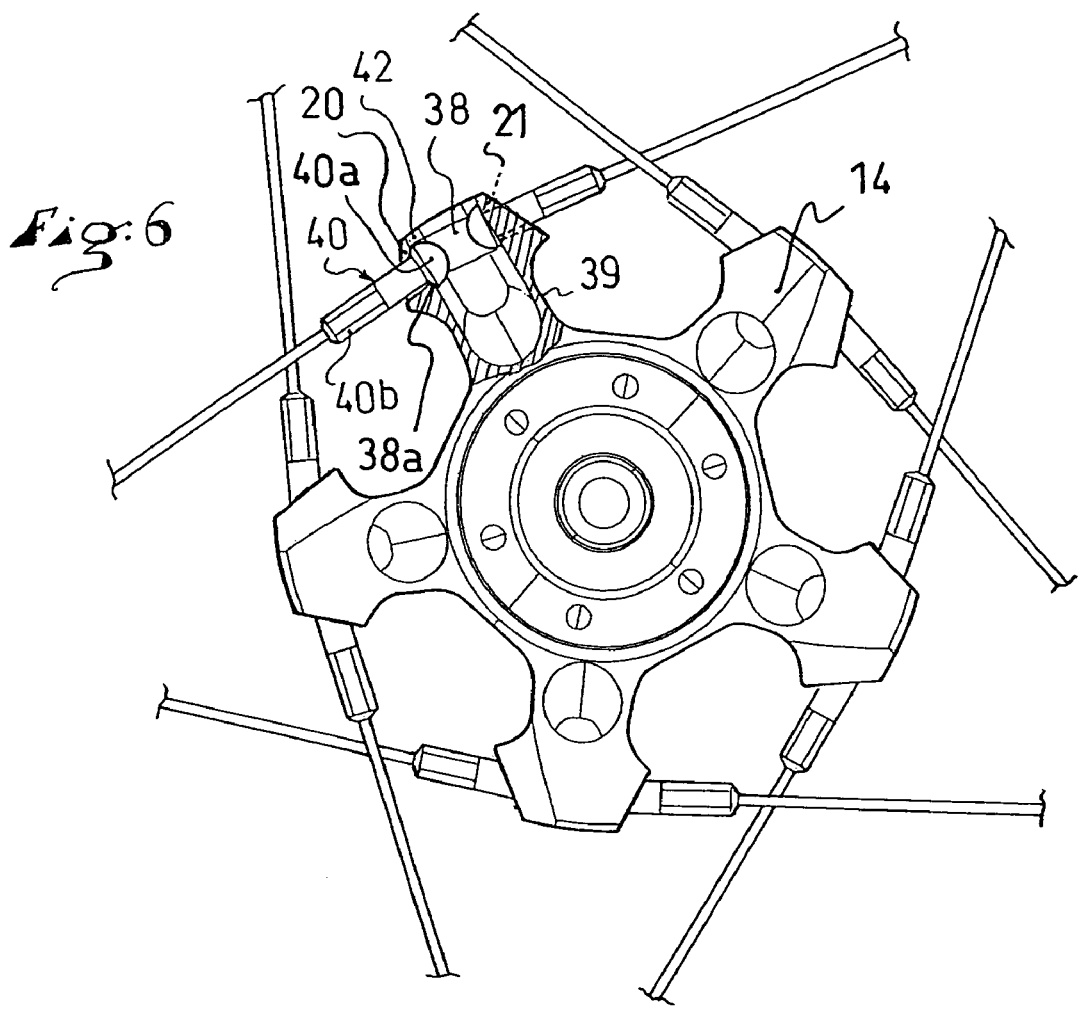
FIG. 6 illustrates an alternative embodiment of the invention.

FIG. 1 shows a cycle wheel 1 that has a rim 2, a central hub 3, and spokes 4 connecting the rim and the hub. The spokes are of a known type; for example, these are aluminum spokes that are consistent with what is described in patent document FR 2 767 285 and family member U.S. Pat. No. 6,189,978, the disclosure of said family member being hereby incorporated by reference thereto in its entirety. These spokes are straight spokes, and they have a tapered body as well as a head at each of its ends. Being made of aluminum, the dimensions of the heads are greater than those of a traditional steel spoke. This is not limiting, however, and any appropriate spoke can be suitable for the invention. The spoke tension is adjusted here by means of hollow screws screwed into threaded openings of the rim.

As can be determined from the drawing figure, the wheel 1 shown is a rear wheel, and the hub 3 has a hub body 5 to which the spokes 4 are fastened within two sets, and, on one side, a free wheel body 7 for the mounting of a sprocket cassette. The hub is rotatably mounted about an axle 8 that is provided to be connected by its ends to the cycle frame.

Conventionally, the hub body 5 includes two end portions 9 and 10 to which the spokes of each of the sets are fastened, and a central portion 11 forming a spacer between the two end portions.

According to the embodiment shown, the spokes 4b that are located on the side of the free wheel have radial spoking, that is, they extend along a radial direction in their set. Any means for fastening these spokes to the hub is suited to the invention. For example, the end portion 10 is a disk provided with housings that are consistent with what is disclosed in the patent document FR 2 802 853 and family member U.S. Pat. No. 6,375,273, the disclosure of said family member being hereby incorporated by reference thereto in its entirety. The spoke heads are retained directly to the central portion 13. Any type of straight or bent spoke and any appropriate means for fastening to the hub can also be suitable.

In particular, the end portion of the hub and the spokes can be of the same type as the hub portion and the spokes opposite the side of the free wheel, which will now be described.

According to the embodiment shown, the spokes 4a of the set opposite the side of the free wheel are fastened according to a crisscrossed method, and the spokes are oriented so as to be substantially tangent with respect to an imaginary circle passing by the spoke heads. In other words, the spokes are grouped by pair, which extend substantially in alignment of one another in opposite directions. By way of example, according to the embodiment shown, two spokes of a group form an obtuse angle of 170° facing the hub axis. As mentioned above, any appropriate spoke is suitable for the invention, the only constraint for the spokes being that they are retained by an enlarged head, such as head 4c, in the area of the portion 9 of the hub.

FIG. 2 shows a side view of the end portion 9 of the hub to which the tangential spokes 4a are fastened. In this side view, it can be seen that a circle concentric with a point represented by the axis of the end portion 9 of the hub and abutting the ends of the spokes 4a would not be intersected by any of the axes of the spokes 4a.

The end portion 9 includes a center 13 that extends the central portion 10 of the hub, and which has a plurality of merlons 14 at its periphery. Five merlons are shown in the figure for a set of spokes that includes 10 spokes 4a. However, these numbers are provided by way of example; indeed, the number of spokes varies depending upon the rigidity desired for the wheel.

Each merlon 14 extends along a radial direction, away from the axis of the hub.

With reference to FIGS. 2 and 3, each merlon 14 has a neck 15 attached to the center 13 of the end portion 9 and above which is a head 16. Two spokes 4a are fastened in the area of the head 16. The necks 15 space the heads 16 away from the hub axis and, therefore, the heads of the spokes. This makes it possible to increase the angle between each of the spokes and the radial direction of the merlon associated with the spoke. The necks are shown in the illustrated embodiment, but they are optional, and the heads could be attached in these housings.

For fastening the spokes, each of the heads 16 has a radial housing 18 that opens out at the top of the head 16, i.e., at the radially outer end of the head. Advantageously, the housing 18 has a cylindrical shape extending along a radial axis. The housing 18 is made using a tool such as a milling cutter or a drill. The inner diameter and depth of a housing 18 are sufficient to allow for the housing of two spoke heads 4c.

Furthermore, each head 16 has two slots 20 and 21. Each of the slots extends through the wall of the merlon, between the housing 18 and each of the frontal surfaces 16a, 16b of the merlon. The width of the slots is smaller than the cross-sectional dimensions of the spoke heads 4c, and greater than the diameter of the spoke bodies 4d in the vicinity of the heads 4c. The depth of the slots is sufficient for each spoke head 4c to be housed and retained in the radial housing 18 of a merlon, with its body that extends through each of the slots 20, 21.

In the illustrated embodiment, the two slots 20 and 21 of a merlon are off-centered along an axial direction by a distance slightly greater than the diameter of a spoke body 4d in order to enable the spokes to very closely cross one another without contacting each other. This arrangement is however optional. In any event, because the spokes do not cross one another in the area of a merlon, the distance at which the spokes cross one another is controlled by the relative arrangement of the slots.

Also according to the illustrated embodiment, the slots are oriented along the direction of the spoke in the spoke set.

Advantageously, the slots are made by means of a milling cutter with a small diameter.

In the illustrated embodiment, the inside of the housing is arranged so that each spoke head bears on a seat that assumes its shape. Thus, each of the two slots 21 and 22 is machined in the area of its opening in the housing 18 to form a seat 23, 24, respectively, which assumes the shape of the bottom of the spoke heads, for example, along a spherical or cylindrical portion that assumes a complementary shape beneath the spoke head. These two seats ensure that the heads are properly seated in the housing 18. Furthermore, they allow for a pivot effect of the spoke head in its housing. Moreover, they improve the retention of the spoke heads in the slots. Indeed, as the head is nested in its seat, including along a radial direction outward of the housing 18, if an accidental loosening of the spoke occurs, the head will remain within the housing 18 without separating from its seat. In the case of a substantial loosening of a spoke, the head of the opposite spoke forms an abutment in the longitudinal direction of the spoke, The seats define the radial position of the spoke heads. Alternatively, this position could be defined by the support of the spoke body against the bottom of the slot.

To guarantee the retention of the spoke heads in the housings of the merlons, one can provide an attached plug that closes the opening of the housing 18. Such a plug is described below in connection with an alternative construction.

In the side view of the embodiment illustrated in FIG. 2, the head 16 has a trapezoidal shape, or substantially such shape, with a base at its junction with the neck 15, the dimensions of which are greater than the dimension of the head.

The neck 15, in a side view, has a dimension smaller than that of the base of the head. In the illustrated embodiment, the neck is machined with a housing 25 oriented along an axial direction. According to the embodiment shown, the housing opens out on the outer side of the hub, but it is blind, and it also communicates with the radial housing 18. This housing makes it possible to remove material and, therefore, to decrease the weight of the hub. Furthermore, with this housing, the neck has a box structure, which provides it with good lateral rigidity under the effect of the traction/tension of the spokes.

FIG. 5 relates to an alternative embodiment. The opening of each housing 18 is closed by means of a plug 28. For example, as shown, the plug has a body 29, the cross-sectional shape and dimensions of which correspond to the surface, as seen from the top that is left free in the housing 18 by the two spoke heads. At the top, the plug has a circular head 30, with a diameter substantially equal to the diameter of the housing 18. As shown, two tongues 31, 32 are provided that are housed in the upper portion of the slots. i.e., radially outer ends of the slots, so as to cover the spokes in this area. However, these tongues are optional. Still optionally, projecting tabs can be provided, such as the tab 33, which are housed in the seats 23, 24 provided for the heads and prevent the plug from coming out of the housings 18.

The plugs are made of any appropriate material, such as, for example, a molded plastic material.

The hub body is made of any appropriate material with machining ability, especially metal, such as aluminum, magnesium, or titanium alloy.

FIG. 6 relates to an alternative embodiment of the invention. According to this alternative, the housings 38 of the merlons 39 are provided to receive conventional spoke nipples, such as the nipple 40, making it possible to adjust the tension of the spokes from the hub. The fastening of the spokes in the area of the rim is done in a conventional manner. The head 40a of the nipple is housed in the housing; the body 40b of the nipple extends through the slot 42 of the merlon in order to enable its coupling outside of the merlon by means of a tightening tool. Conventionally, the spokes have a threaded end that is screwed into the nipple, thus allowing for an adjustment of the spoke tension. In this case, the seats 38a receiving the spoke heads 40a within the housing 38 can be machined to have a partial spherical shape to facilitate the rotation of the spoke nipples therein.

Figure 7:
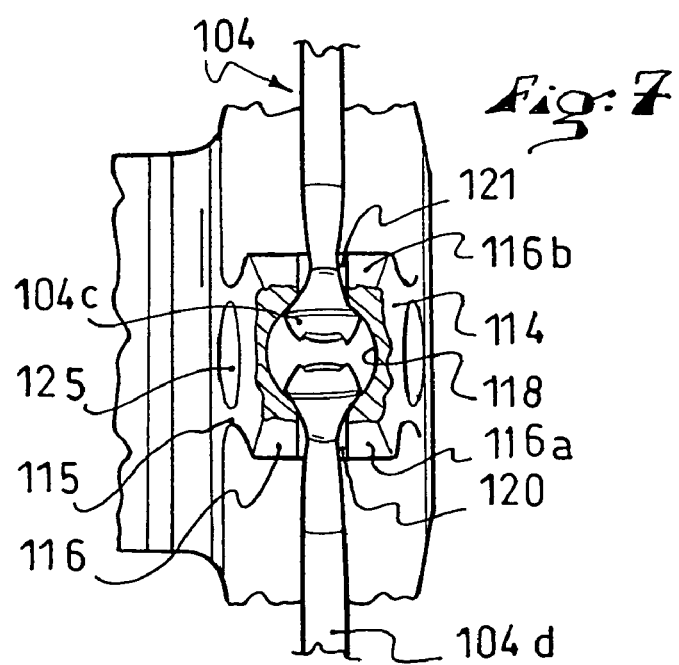
FIG. 7 is a view, similar to FIG. 4, of a hub according to another alternative embodiment of the invention.

FIG. 7 shows another alternative embodiment of the invention, in which similar or identical elements are designated by the same reference numerals increased by 100.

According to this alternative embodiment, each merlon 114 includes a neck 115 overlaid by a head 116. The head has a radial housing 118 which, in the illustrated embodiment, has a cylindrical shape, and which opens out at the top of the head 116. The inner diameter and the depth of the housing 116 are sufficient to allow for the housing of the spoke heads 104c.

Similarly, each head 116 includes two slots 120 and 121. Each of the slots 120, 121 extends through the wall of the merlon, between the wall of the housing 118 and each of the frontal surfaces 116a, 116b of the merlon.

As in the other embodiments, the width of the slots 120, 121 is smaller than the cross-sectional dimensions of the spoke heads 104c, and greater than the diameter of the bodies 104d of the spokes in the vicinity of the heads 104c.

Contrary to the embodiments described, the two slots 120 and 121 are aligned. i.e., they extend along a single axis and can therefore be made during the same milling operation by means of a milling cuffer having an adapted diameter.

In relation to the other embodiments, the result is greater simplicity and production rate, and therefore a lower manufacturing cost.

As in the preceding cases, the slots 120, 121 can be machined in the area of their opening in the housing 118 to form seats for the spoke heads 104.

The neck 115 can also be bored with an axial housing 125, a through housing in this case, to lighten the construction. Plugs (not shown in FIG. 7) can be provided to block the housings 118.

The invention is not limited to the particular examples of hub bodies that have just been described. In particular, it applies to a hub that would have a set of radial spokes on the side opposite the free wheel, and crisscrossed spokes on the side of the free wheel, that is, an inverted arrangement in relation to what has been described previously. It also applies to a front or rear hub that would have two sets of crisscrossed spokes, and therefore two hub body ends similar to what has been described in relation to FIGS. 2-4.

The invention also applies to the hub of a wheel that would be equipped with a flange such as, for example, the hub disclosed in the aforementioned patent document FR 2 794 063.

Finally, the invention also relates to a cycle wheel equipped with a hub consistent with what has been described previously.

The present description is provided by way of example, and other embodiments of the invention could be adopted without leaving the scope thereof.

The invention claimed is:

1. A hub for a cycle wheel, said hub comprising:
a shaft extending axially along an axis;
a hub body rotatably mounted around the shaft, the hub body comprising two end portions;
each of the end portions comprising an arrangement to fasten spokes to said end portions;
said arrangement for at least one of said two end portions comprising a plurality of merlons extending radially of the axis of the hub, each said merlon comprising:
two frontal surfaces;
a housing elongated radially, said housing opening out at a radially outer end;
two slots, each said slot being elongated radially and extending through a wall thickness between the radially extending housing and a respective one of said two frontal surfaces.

2. A hub according to claim 1, wherein:
the radially elongated housing of each of said merlons has a cylindrical shape having a circular opening at said radially outer end.

3. A hub according to claim 1, wherein:
the radially elongated housing of each of said merlons has a shape of a cylinder, said cylinder extending along a radial axis;
said housing has a circular opening at said radially outer end.

4. A hub for a cycle wheel, said hub comprising:
a shaft;
a hub body rotatably mounted around the shaft, the hub body comprising two end portions;
each of the end portions comprising an arrangement to fasten spokes to said end portions;
said arrangement for at least one of said two end portions comprising a plurality of radially oriented merlons, each said merlon comprising:
two frontal surfaces;
a radially extending housing opening out at a radially outer end;
two slots, each said slot extending through a wall thickness between the radially extending housing and a respective one of said two frontal surfaces; each of said slots being radially elongated; and each of said slots having a radially outer end;
a seat is provided at an opening of each slot in the radially extending housing for receiving an enlarged head of the spoke to be fastened.

5. A hub according to claim 4, wherein:
the radially extending housing of each of said merlons has a cylindrical shape having a circular opening at said radially outer end.

6. A hub according to claim 4, wherein:
the two slots of each of said merlons are radially off-centered.

7. A hub according to claim 4, wherein:
the two slots of each of said merlons are aligned by extending along a single axis to adapt said slots to be made during a single machining operation.

8. A hub according to claim 4, wherein:
the two slots of each of said merlons have machined openings forming seats for seating heads of fastened spokes.
9. A hub according to claim 4, wherein:
each of the merlons comprises a neck and a head.
10. A hub according to claim 9, wherein:
each of the heads of the merlons has a generally trapezoidal shape in a side view.
11. A hub according to claim 9, wherein:
each of the heads of the merlons has a base, in a side view, having a greater dimension than the neck.
12. A hub according to claim 9, wherein:
each of the necks of the merlons is bored with a housing extending in an axial direction.
13. A hub according to claim 4, further comprising:
a plug blocking the opening of each of the housings at the radially outer ends of the merlons.
14. A hub according to claim 4, further comprising:
plugs blocking respective ones of the openings of the housings of the merlons, said plugs covering radially outer ends of said slots of the merlons.
15. A cycle wheel comprising:
a rim;
a hub;
two separately distributed sets of spokes;
the hub having two axially spaced-apart end portions, each of the end portions having an arrangement to fasten a respective one of said two sets of spokes, at least one of said two sets of spokes being such that each of said spokes has an enlarged head;
at least one of the arrangements comprising a plurality of radially oriented merlons, each said merlon comprising:
two frontal surfaces;
a radially extending housing opening out at a radially outer end, said radially outer end opening being of a dimension to allow said enlarged head to be inserted through said opening;
two slots, each said slot extending through a wall thickness between the radially extending housing and a respective one of said two frontal surfaces; each of said slots being radially elongated; and each of said slots having a radially outer end,
a seat is provided at an opening of each slot in the radially extending housing for retaining one spoke.
16. A cycle wheel according to claim 15, wherein:
the radially extending housing of each of said merlons has a cylindrical shape having a circular opening at said radially outer end.
17. A cycle wheel according to claim 15, wherein:
the radially extending housing of each of said merlons has a shape of a cylinder, said cylinder extending along a radial axis;
said housing has a circular opening at said radially outer end.
18. A cycle wheel according to claim 15, wherein:
the two slots of each of said merlons are radially off-centered.
19. A cycle wheel according to claim 15, wherein:
the two slots of each of said merlons are aligned by extending along a single axis to adapt said slots to be made during a single machining operation.
20. A cycle wheel according to claim 15, wherein:
the two slots of each of said merlons have machined openings forming seats for seating heads of fastened spokes.
21. A cycle wheel according to claim 15, wherein:
each of the merlons comprises a neck and a head.
22. A cycle wheel according to claim 21, wherein:
each of the heads of the merlons has a generally trapezoidal shape in a side view.
23. A cycle wheel according to claim 21, wherein:
each of the heads of the merlons has a base, in a side view, having a greater dimension than the neck.
24. A cycle wheel according to claim 15, further comprising:
plugs blocking respective ones of the openings of the housings of the merlons, said plugs covering radially outer ends of said slots of the merlons.
25. A cycle wheel comprising:
a rim;
an axially extending hub;
two separately distributed sets of spokes, at least one of said sets of spokes comprising spokes having enlarged headed ends;
the hub having two axially spaced-apart end portions, each of the end portions having an arrangement to fasten a respective one of said two sets of spokes;
at least one of the arrangements comprising a plurality of merlons extending radially of the axis of the hub, each said merlon comprising:
two frontal surfaces;
a radially extending housing opening out at a radially outer end;
two slots, each said slot extending through a wall thickness between the radially extending housing and a respective one of said two frontal surfaces;
spokes of said one of said sets of spokes being fastened to said hub by extending through respective ones of said slots of said merlons with respective ones of said enlarged headed ends being positioned within said radially extending housing;
a circle concentric with the axis of the hub and abutting the enlarged headed ends of the spokes not being intersected by an axis of any of said spokes of said one of said sets of spokes.
26. A cycle wheel according to claim 25, wherein:
said radially outer end opening having a dimension to allow said enlarged headed ends of said spokes to be inserted through said opening.
27. A cycle wheel according to claim 25, wherein:
the radially extending housing of each of said merlons has a shape of a cylinder, said cylinder extending along a radial axis;
said housing has a circular opening at said radially outer end.
28. A cycle wheel according to claim 25, wherein:
the two slots of each of said merlons are radially off-centered.
29. A cycle wheel according to claim 25, wherein:
the two slots of each of said merlons are aligned to adapt said slots to be made during a single machining operation.
30. A cycle wheel according to claim 25, wherein:
the two slots of each of said merlons have machined openings forming seats for seating heads of fastened spokes.
31. A cycle wheel according to claim 25, wherein:
said spokes of said one of said sets of spokes have nipples screw-threaded to respective ones of said spokes;
said enlarged headed ends of said one of said sets of spokes consist of heads of said nipples.
32. A cycle wheel according to claim 25, further comprising:
plugs blocking respective ones of the openings of the housings of the merlons, said plugs covering radially outer ends of said slots of the merlons.

* * * * *